United States Patent
Wu et al.

(10) Patent No.: US 7,528,323 B2
(45) Date of Patent: May 5, 2009

(54) POWER SUPPLY COVER BOX

(76) Inventors: Hsinhan Wu, 14821 74th Pl. NE., Kenmore, WA (US) 98028; Jeffrey M. Alexander, 15923 441st Pl. SE., North Bend, WA (US) 98045

(\*) Notice: Subject to any disclaimer, the term of this patent is extended or adjusted under 35 U.S.C. 154(b) by 67 days.

(21) Appl. No.: 11/588,267

(22) Filed: Oct. 27, 2006

(65) Prior Publication Data
US 2007/0227755 A1   Oct. 4, 2007

Related U.S. Application Data

(60) Provisional application No. 60/788,332, filed on Apr. 3, 2006, provisional application No. 60/795,483, filed on Apr. 28, 2006.

(51) Int. Cl.
*H01R 13/72* (2006.01)
(52) U.S. Cl. .................. 174/66; 174/67; 439/501; 220/241
(58) Field of Classification Search .......... 174/66, 174/67; 220/241, 242; 439/516, 528, 501
See application file for complete search history.

(56) References Cited

U.S. PATENT DOCUMENTS

| | | | | |
|---|---|---|---|---|
| 2,943,138 A * | 6/1960 | Reager | .................. | 174/66 |
| 3,113,996 A * | 12/1963 | Sanford | .................. | 174/67 |
| 4,921,444 A * | 5/1990 | Cama | .................. | 439/528 |
| 6,130,384 A * | 10/2000 | Esteves et al. | .................. | 174/66 |
| 6,297,450 B1 * | 10/2001 | Yu | .................. | 174/66 |
| 6,756,543 B1 | 6/2004 | Kaloustian | | |
| 6,916,989 B2 * | 7/2005 | Broussard, Jr. | .................. | 174/66 |
| 6,943,296 B2 * | 9/2005 | Perrella et al. | .................. | 174/66 |
| 7,067,737 B2 * | 6/2006 | Mallen | .................. | 174/66 |
| 7,230,181 B2 * | 6/2007 | Simmons et al. | .................. | 174/66 |
| 7,247,799 B2 * | 7/2007 | Mori et al. | .................. | 174/154 |

\* cited by examiner

*Primary Examiner*—Dhiru R Patel
(74) *Attorney, Agent, or Firm*—Birch, Stewart, Kolasch & Birch, LLP

(57) ABSTRACT

An outlet cover includes an outlet surface and a cord container for convenient cord storage is provided. The outlet surface has at least one outlet opening, and the cord container is disposed corresponding to the outlet opening. The above cord container has a plurality of cord entry/exit holes and at least one passage connecting the plurality of cord entry/exit holes. A power supply cover box includes a body and at least a cord container is also provided. The body includes a first end having at least one outlet opening. The cord container of the power supply cover box has a plurality of cord entry/exit holes and passages connecting the plurality of cord entry/exit holes. The passages have a predetermined width, which is preferably slightly smaller than the diameter of a regular electric cord, to retain the cord within the cord container. The cord container only allows the cord to enter or exit through the cord entry/exit holes.

40 Claims, 13 Drawing Sheets

POWER SUPPLY COVER BOX

This application claims benefit to a provisional application No. 60/788,332 filed on Apr. 3, 2006, and to another provisional application No. 60/795,483 filed on Apr. 28, 2006.

BACKGROUND OF THE INVENTION

1. Field of the Invention

The present invention relates generally to modified outlet covers, and more particularly to a power supply cover box with versatile features such as electrical outlets or USB ports, cord management containers and utility trays.

2. Description of the Prior Art

The historic discovery and generation of electricity has changed the way people lived significantly. Availability of electricity as well as reliable and effective electric power delivery system led to widespread use of various electric appliances and other devices. Yet an electric appliance is without value unless it is plugged into an electrical outlet for power connection. Consequently, as modern life gets more and more high-tech, electrical outlets have become an essential and standard feature at home, in offices and so on since they are relatively simple in operation and are convenient resources for tapping into the power of electricity.

Nevertheless, electrical receptacle outlets in walls and floors may present shock and electrical fire hazards to people. The U.S. Consumer Product Safety Commission (CPSC) estimates that each year, about 4,000 injuries associated with electric extension cords are treated in hospital emergency rooms. About half the injuries involve fractures, lacerations, contusions, or sprains from people tripping over extension cords. CPSC also estimates that about 3,300 residential fires originate in extension cords each year, killing 50 people and injuring 270 others.

From the above statistics, we can recognize the necessity of cord management on a typical electrical outlet as we enjoy the convenience of modern life. While several earlier cord containers achieve the purpose of cord management, they are usually quite bulky in size and relatively time consuming in operation.

Therefore, what is needed is an outlet cover with a cord management container to store excessive cords easily and effectively. What is also needed is an outlet cover with utility tray to lift up charged devices from the floor, kitchen counter or table top and to provide a centralized charging station. What is also desired is a power supply cover box having the aforementioned features as well as USB ports for charging common hand held devices without using adapters.

SUMMARY OF THE INVENTION

It is an object of the present invention to provide an outlet cover/power supply cover box with a cord management container.

It is another object of the present invention to provide an outlet cover/power supply cover box with utility tray.

It is a further object of the present invention to provide a power supply cover box with electrical outlets and/or an USB (Universal Serial Bus) hub.

The present invention achieves these and other objectives by providing an outlet cover comprising an outlet surface and a cord management container. The outlet surface has at least one outlet opening, and the cord management container is disposed corresponding to the outlet opening. The above cord management container has a plurality of cord holes and at least 1 passage connecting the plurality of cord holes. The passage has a predetermined width, which is preferably slightly smaller than the diameter of a regular electric cord, to retain the cord within the cord management container. The cord management container only allows the cord to enter or exit through the cord holes.

The above cord management container includes a cord cover which is removable from the outlet surface. The cord cover has at least one winding post disposed on the outlet surface, and at least one hook disposed at side of the winding post on the outlet surface. The cord management container has a top surface, a side surface and a bottom surface. The top surface and bottom surface are opposite to each other, and the side surface connects the top surface and the bottom surface. One of the plurality of cord holes is formed on the top surface and the bottom surface respectively of the cord management container. The outlet opening of the outlet cover is on one half of the outlet surface, and the cord management container is on the other half of the outlet surface.

The material of the above outlet cover is flame retardant, and is selected from the group of rubber, silicone rubber, hard plastic and the combination thereof. The outlet surface and the cord management container are either integratedly formed or bound together by employing the method selected from the group of adhesive, heat staking, adhesive doubled sided tape and mechanical slides, mechanical hooks, slots and the combination thereof. The outlet cover of the present invention may further comprise utility tray disposed with the outlet surface through a groove formed thereon. The utility tray is also removable from the outlet surface.

Applying the same principle, the present invention achieves the aforementioned objectives also by providing a power supply cover box comprising a box-shaped body and a cord management container. The box-shaped body includes a first end having at least one outlet opening, and the cord management container is disposed corresponding to the outlet opening. The cord management container has a plurality of cord holes and passages connecting said plurality of cord holes. The outlet box of the present invention further comprises an electrical outlet and/or USB (Universal Serial Bus) port disposed within the outlet opening.

The box-shaped body of the above power supply cover box has a top end and a bottom end; the cord management container has two side surfaces and one front surface with the two side surfaces being opposite to each other and the front surface being connecting the two side surfaces, and the cord management container is disposed on one of the top end and the bottom end of the box-shaped body. At least one of the plurality of cord holes is formed on one of the two side surfaces and on the front surface of the cord management container. The passages connect one of the cord holes formed on the front surface with another cord hole formed on one of the two side surfaces.

The box-shaped body of the above power supply cover box has a side end; the cord management container has a top surface, a side surface and a bottom surface and is disposed on the side end of the box-shaped body. At least one of the plurality of cord holes is formed on the top surface, the side surface and the bottom surface respectively of the cord management container. The passages connect one of the cord holes formed on the side surface with another cord hole formed on the top surface or the bottom surface.

The box-shaped body of the above power supply cover box includes a second end which is adjacent to the first end, and the cord management container is disposed on the second end of the box-shaped body. In one embodiment, the first end is on the front of the box-shaped body, and the second end is on the top of the box-shaped body. Alternatively, the first end is on the top of the box-shaped body, and the second end is on the side of the box-shaped body. The cord management container of the above power supply cover box includes a cord cover having a top surface, a side surface and a bottom surface. The top surface and the bottom surface are opposite to each other, and the side surface connects the top surface and the bottom surface. The cord cover of the above power supply cover box has at least one winding post disposed on the second end of the box-shaped body. The cord cover also has at least one hook disposed at side of the winding post on the second end.

Alternatively, the box-shaped body of the above power supply cover box has a back end extending horizontally to have at least one extending portion. The cord cover of the power supply cover box has at least one winding post disposed on the extending portion. The cord cover also has at least one hook disposed at side of the winding post on the extending portion. The material of the power supply cover box is flame retardant, and is selected from the group of rubber, silicone rubber, hard plastic and the combination thereof. The power supply cover box may further comprise at least one utility tray disposed on the box-shaped body including a third end, and the utility tray is disposed on the third end of the box-shaped body. The power supply cover box may further comprise a LED (light emitting diode) surge indicator on the box-shaped body.

One advantage of the present invention is that the proposed outlet cover/power supply cover box has a cord management container for convenient cords storage. By hiding the unsightly bundles of excessive cords and expose only the necessary length of the cord used, potential hazards, such as people tripping over the extension cords, can be minimized.

Another advantage of the present invention is that outlet cover/power supply cover box has utility trays for holding the connected devices during charging. As the devices are lifted up from the floor, kitchen counter or table top, the outlet cover/power supply cover box further reduces the clutter of excessive cords and provides a centralized charging station for the connected devices.

Still another advantage of the present invention is that a USB hub having several USB ports can either replace electrical outlets disposed within the outlet opening or can be configured onto another end of the box-shaped body of the power supply cover box for charging common hand held devices without using adapters and eliminate the excessive cords.

The aforementioned objects, features and advantages will become apparent from the following detailed description of preferred embodiments taken together with the accompanying drawings.

BRIEF DESCRIPTION OF THE DRAWINGS

A preferred embodiment of the invention will be illustrated further in the following description and accompanying drawings, and wherein:

FIG. 4a illustrates the outlet cover with the cord cover on.

FIG. 5b illustrates an embodiment of the power supply cover box in FIG. 5a.

FIG. 6b illustrates an embodiment of the power supply cover box in FIG. 6a.

DETAILED DESCRIPTION OF THE PREFERRED EMBODIMENTS

The present invention proposes an outlet cover and a power supply cover box with versatile features employing the same principle to maximize the value of a common wall outlet or other power supply sources.

Figure 1:
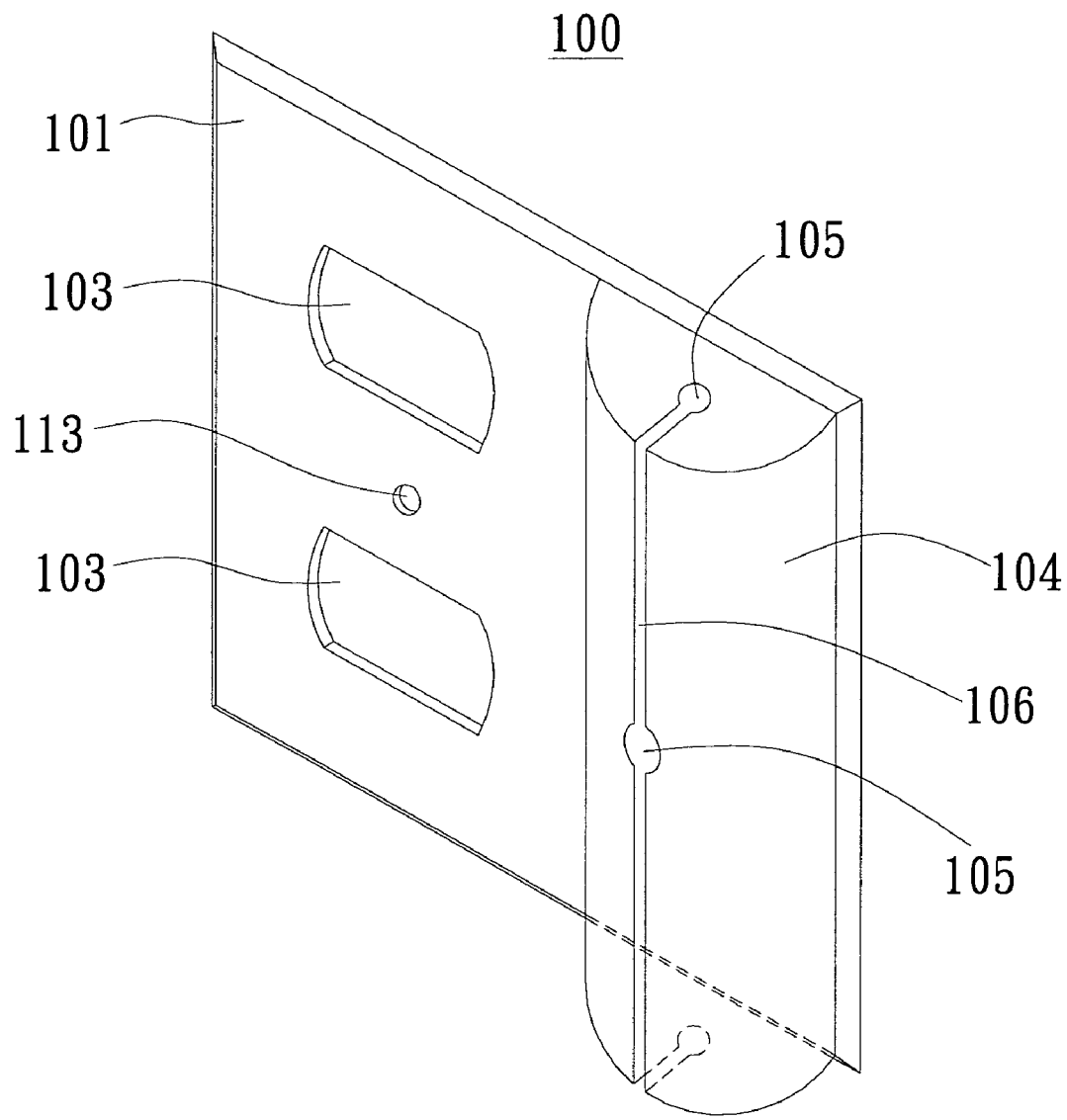
FIG. 1 is a schematic diagram of the outlet cover according to an embodiment of the present invention.
Figure 2:
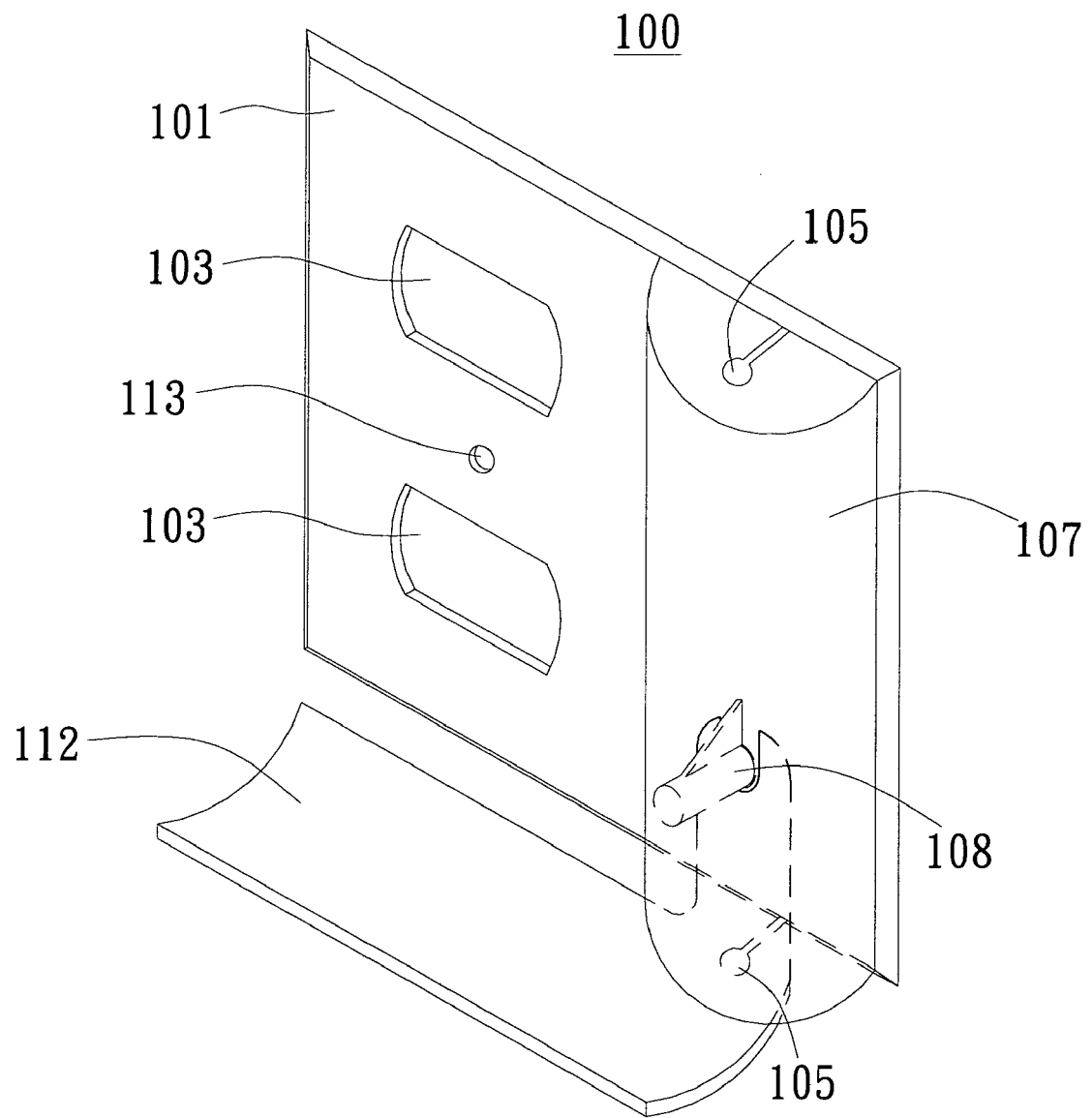
FIG. 2 is a schematic diagram of an alternative outlet cover according to an embodiment of the present invention.
Figure 3A:
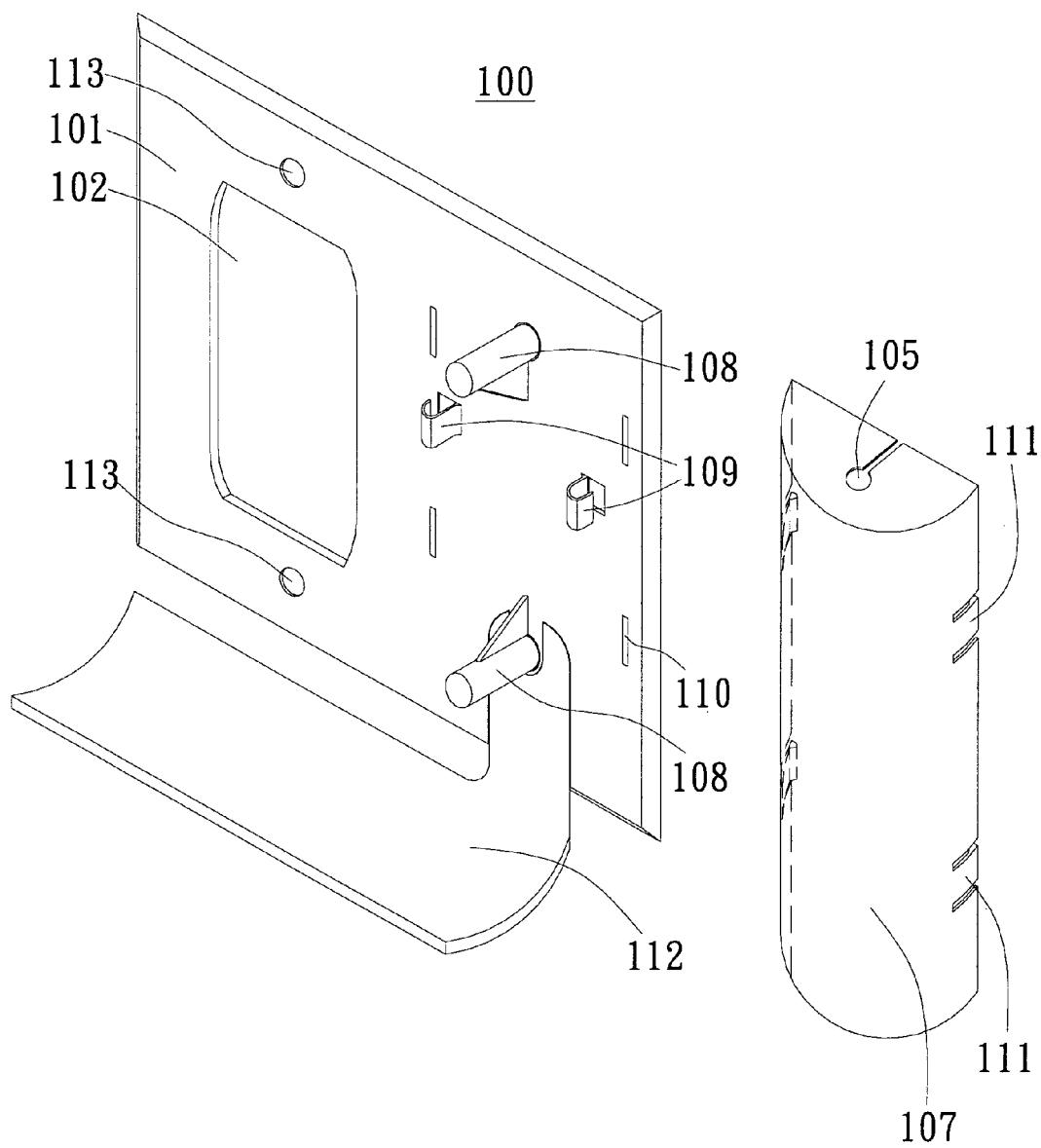
FIG. 3a is a schematic diagram of the outlet cover with one large opening on the outlet surface.
Figure 3B:
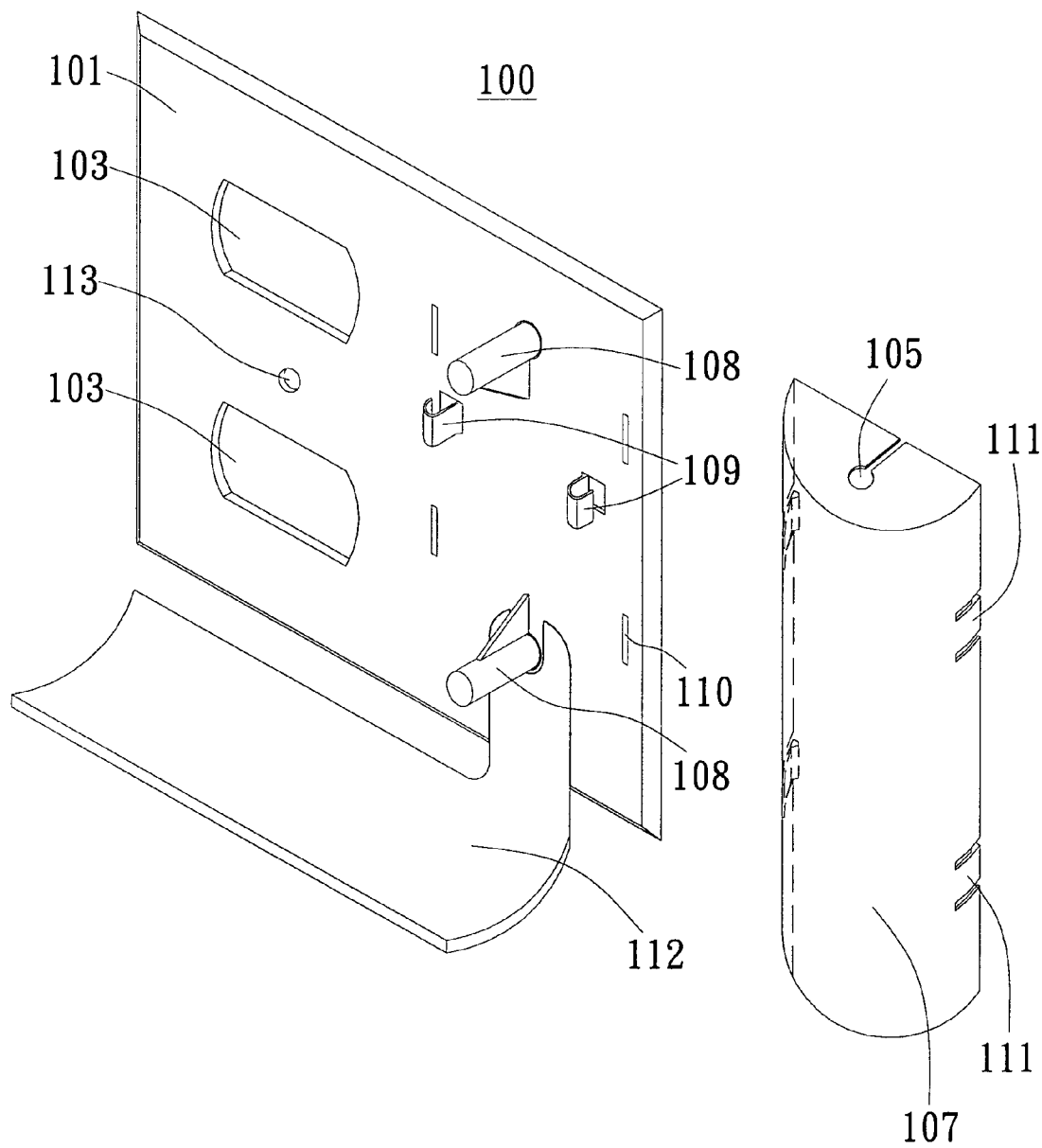
FIG. 3b is a schematic diagram of the outlet cover with two outlet openings on the outlet surface.

FIG. 1 shows a schematic diagram of an outlet cover 100 according to an embodiment of the present invention. The outlet cover 100 comprises an outlet surface 101 and a cord management container 104 protruding from the outlet surface 101. The outlet surface 101 has two outlet openings 103 formed on one half of the outlet surface 101, and the cord management container 104 is disposed corresponding to the outlet openings 103. In this embodiment, the cord management container 104 is disposed on the other half of the outlet surface 101 and on a side of the outlet openings 103. The cord management container 104 is close to the outlet opening 103 in order to reduce the length of the un-stored and exposed cord. The outlet surface 101 and the cord management container 104 of the outlet cover 100 in FIG. 1 are formed integratedly, therefore the outlet cover 100 is a single piece of finished hardware to users.

A plurality of cord holes 105 are formed on the surface of the cord management container 104 for convenient cord storage. As shown in FIG. 1, one cord hole 105 is formed on each of the top surface, the side surface and the bottom surface respectively of the cord management container 104 to enable users to put excessive cords handily into the container 104. In addition, a slit 106 on the surface of the cord management container 104 which facilitates excessive cord storage into the container 104 forms a passage connecting the cord holes 105. The slit 106 has a predetermined width, which is preferably slightly smaller than the diameter of a regular electric cord, to retain the cord within the cord management container 104. In other words, under normal circumstances, the cord management container 104 only allows the cord to enter or exit through the cord holes 105.

Alternatively, the cord management container 104 in FIG. 1 may further include a cord cover 107, as shown in FIGS. 2-4a. The outlet cover 100 can be made either with one large opening 102, as depicted in FIG. 3a, or with two outlet openings 103 formed on the outlet surface 101 just like a typical wall outlet plate, as depicted in FIG. 3b. The cord cover 107 is removable from the outlet surface 101, and can be bound with the outlet surface 101 using adhesive, heat staking, adhesive double sided tape, mechanical slides, mechanical hooks, slots or the combination thereof. In a preferred embodiment of the present invention, the cord cover 107 is fastened onto the outlet surface 101 through four insetting pieces 111 on the edge of the cord cover 107 inserting into four slots 110 on the outlet surface 101, as shown in FIGS. 3a & 3b.

In contrast with the outlet cover 100 shown in FIG. 1, which is a simplified version of the outlet cover of the present invention, the outlet cover 100 may further comprise utility tray 112 for holding various kinds of devices, as illustrated in FIGS. 2-4b. In one embodiment, the utility tray 112 is configured onto the outlet surface 101 through a groove formed right below the cord cover 107 on the outlet surface 101 and thus is removable from the outlet surface 101. Users can replace the utility tray 112 if it is broken or unnecessary, or put on a different attachment if desired. In another embodiment, the utility tray 112 may also be made integratedly with the outlet surface 101 and extended from the bottom, top, or side edge thereof.

Figure 4A:
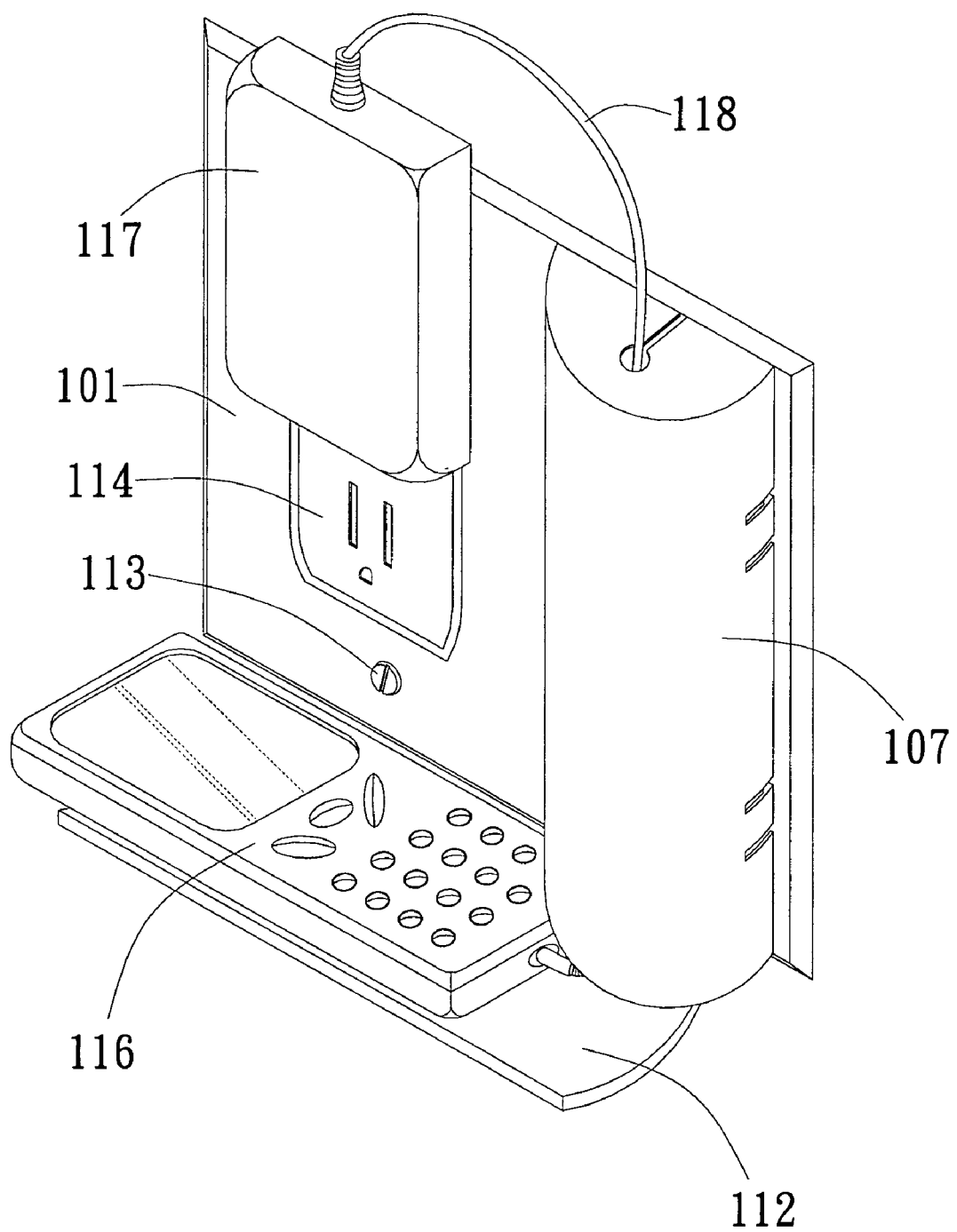
Figure 4B:
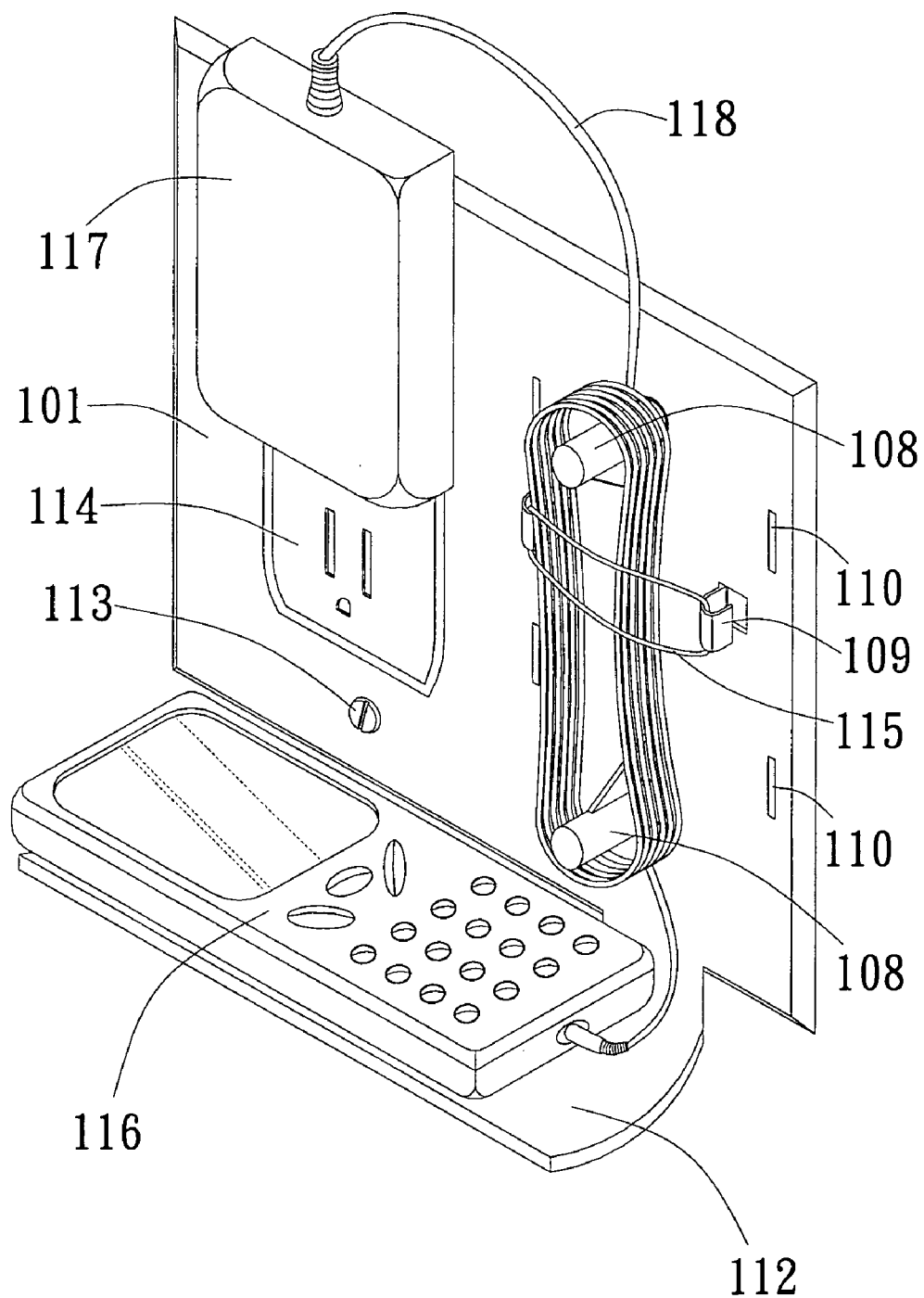
FIG. 4b illustrates the same embodiment of the outlet cover in FIG. 4a with the cord cover removed.

FIG. 4a illustrates an embodiment of the outlet cover with the cord cover 107 attached to the outlet surface 101 in accordance with the present invention, whereas FIG. 4b shows the same embodiment in FIG. 4a but with the cord cover 107 taken off. The cord cover 107 has a pair of cord holes 105 oppositely disposed on the top surface and the bottom surface respectively. The cord cover 107 also forms a space to contain the cord and to serve the function as a passage which connects the pair of cord holes 105. When the cord cover 107 is removed from the outlet surface 101, two winding posts 108 for winding excessive cords into coiled cords and two hooks 109 disposed at side of the two winding posts 108 for holding a rubber band 115 or the like to keep the coiled cords in place can be observed, as illustrated in FIG. 4b. The two winding posts 108 disposed on the outlet surface 101 have gussets for added strength. In another embodiment, however, the winding posts 108 may be disposed on an inner surface of the cord cover 107. In FIG. 4a, a cell phone 116 on the utility tray 112 is charged using an adapter 117 plugged into an electrical outlet 114 with adapter cord 118 stuffed inside the cord cover 107.

A screw hole 113 is used to fix the outlet cover 100 on the wall. However, it shall be appreciated that the specific embodiment above of the invention has been described herein for purposes of illustration rather than limiting the invention. For example, besides the screw hole 113, the fastening methods of the outlet cover 100 onto to the wall include, but not limit to, adhesive, tape and hanger. Moreover, the materials of the outlet cover 100 in accordance with the present invention are flame retardant and UL certified. The materials of the cord management containers 104 are preferably rubber, silicone rubber, hard plastic or the combination thereof.

Figure 5A:
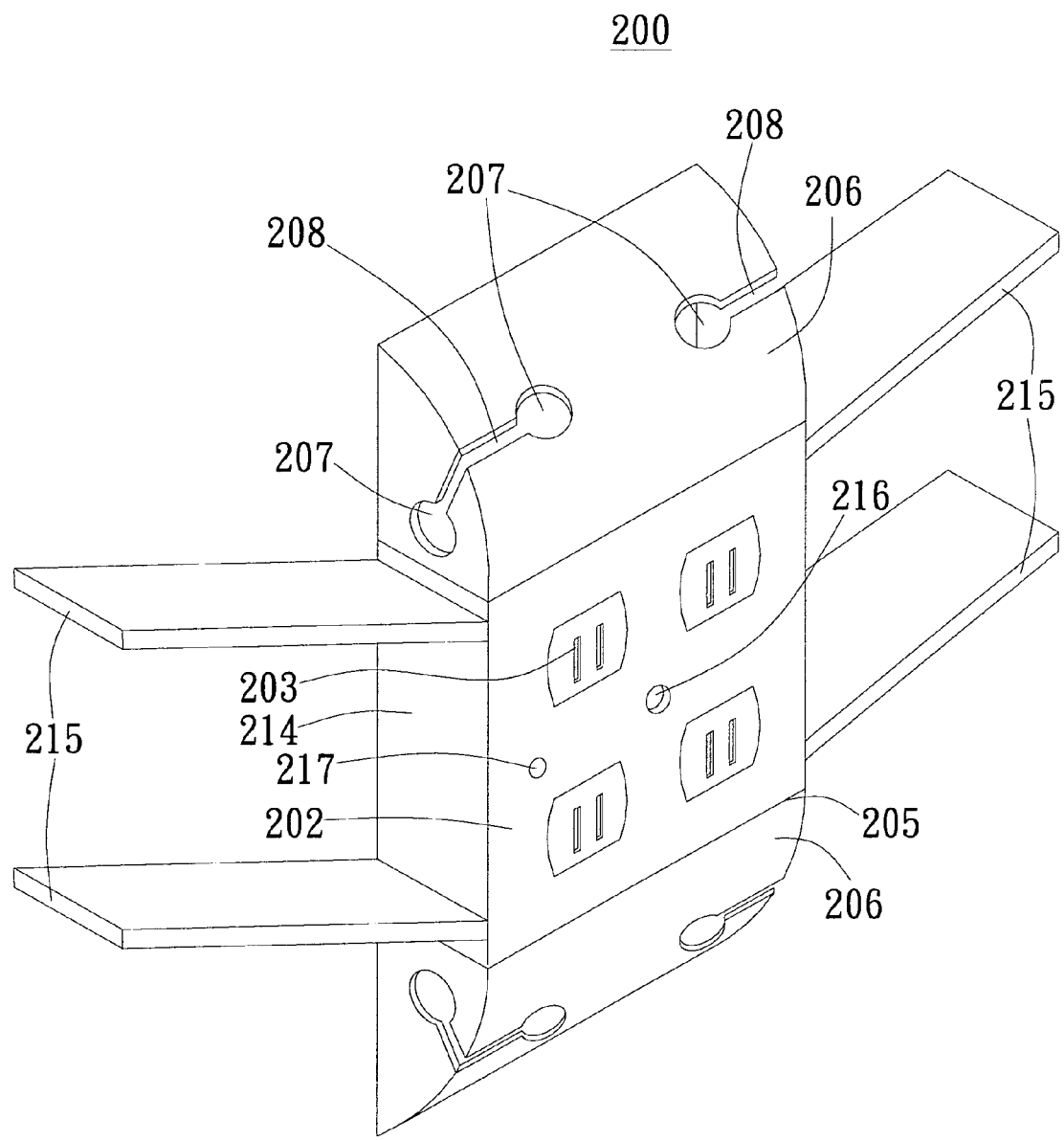
FIG. 5a is a schematic diagram of a power supply cover box in accordance with the present invention.

Applying the same principle, the present invention also proposes a power supply cover box 200 comprising a body 201 and at least one cord management container 206. FIG. 5a shows a schematic diagram of the power supply cover box 200 with four outlet openings and two cord containers 206 in accordance with the present invention. Either an electrical outlet 203 or a USB (universal serial bus) port 204 (not shown here, but shown in FIG. 9) can be disposed within the outlet opening. Since the USB port 204 also supplies electrical power to the devices connecting therewith, it is also deemed to be a kind of electrical outlet 203 in this embodiment. In addition, the outlet openings here also include the slots for a plug to insert and make an electrical connection with the electrical outlets 203 therein. The body 201 includes a first end 202 having four electrical outlets 203 in FIG. 5a. It shall be noted that adequate spaces between the outlet openings are provided to accommodate adapters.

Figure 5B:
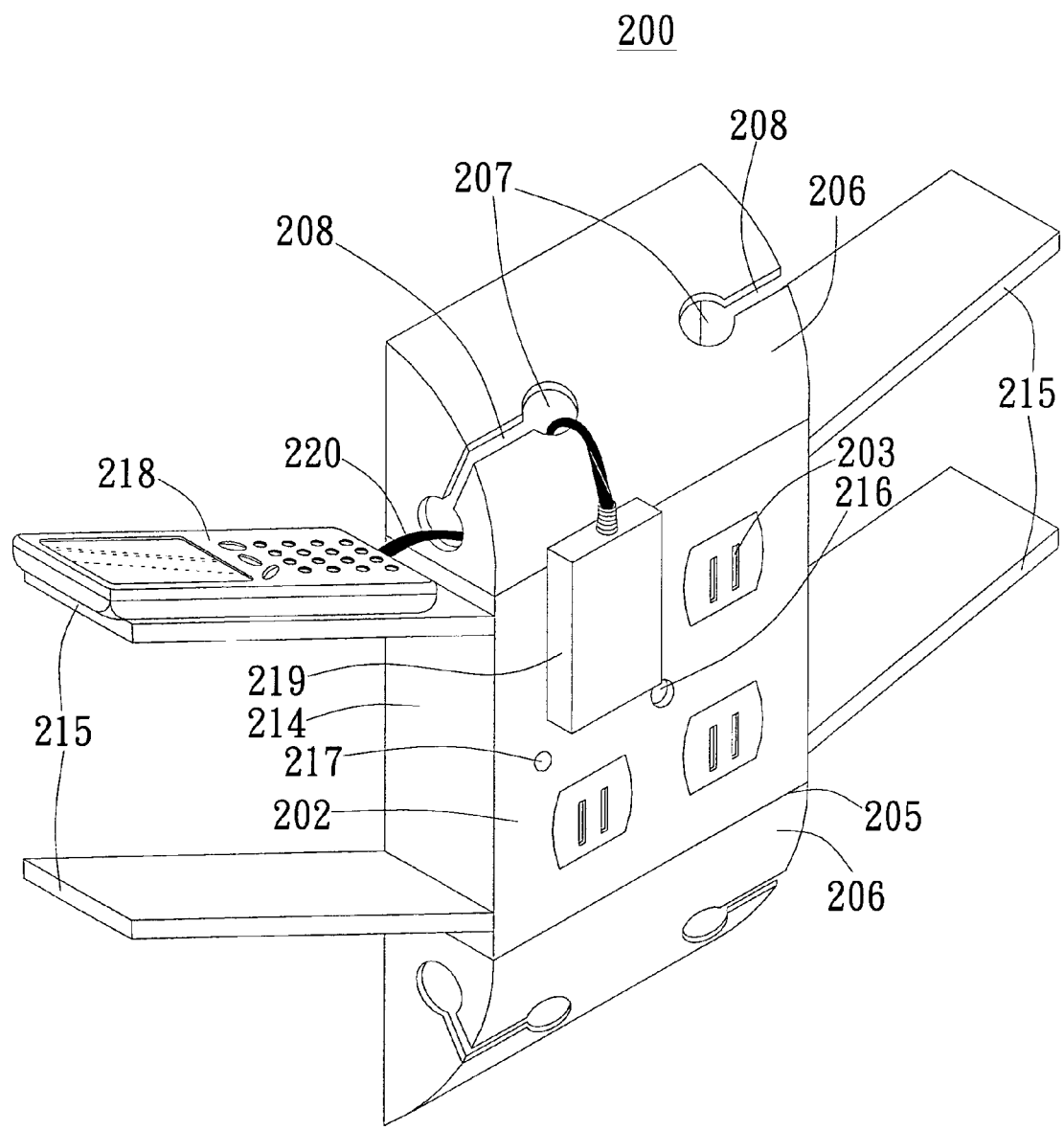
Figure 6A:
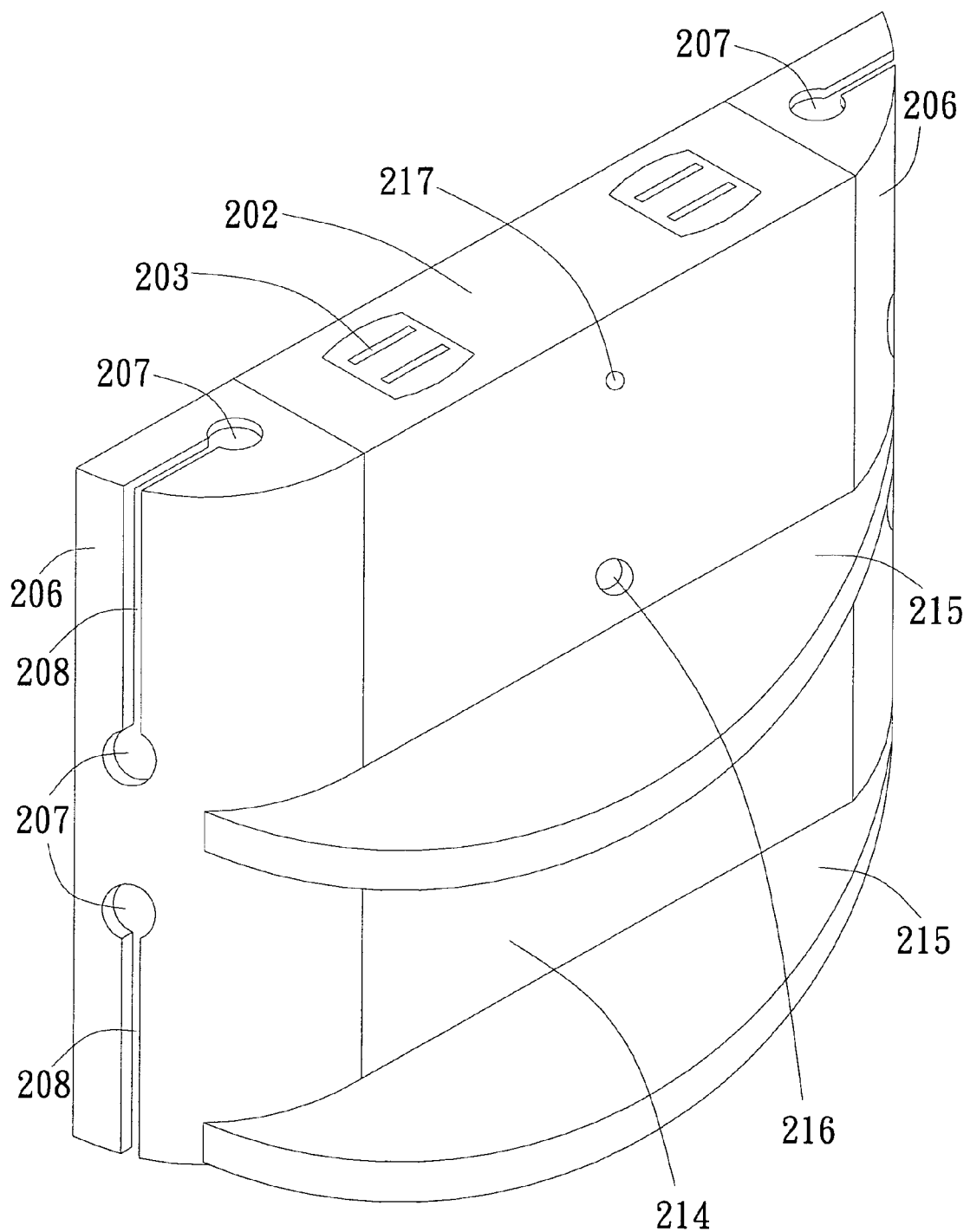
FIG. 6a shows a schematic diagram of an alternative power supply cover box in accordance with the present invention.
Figure 6B:
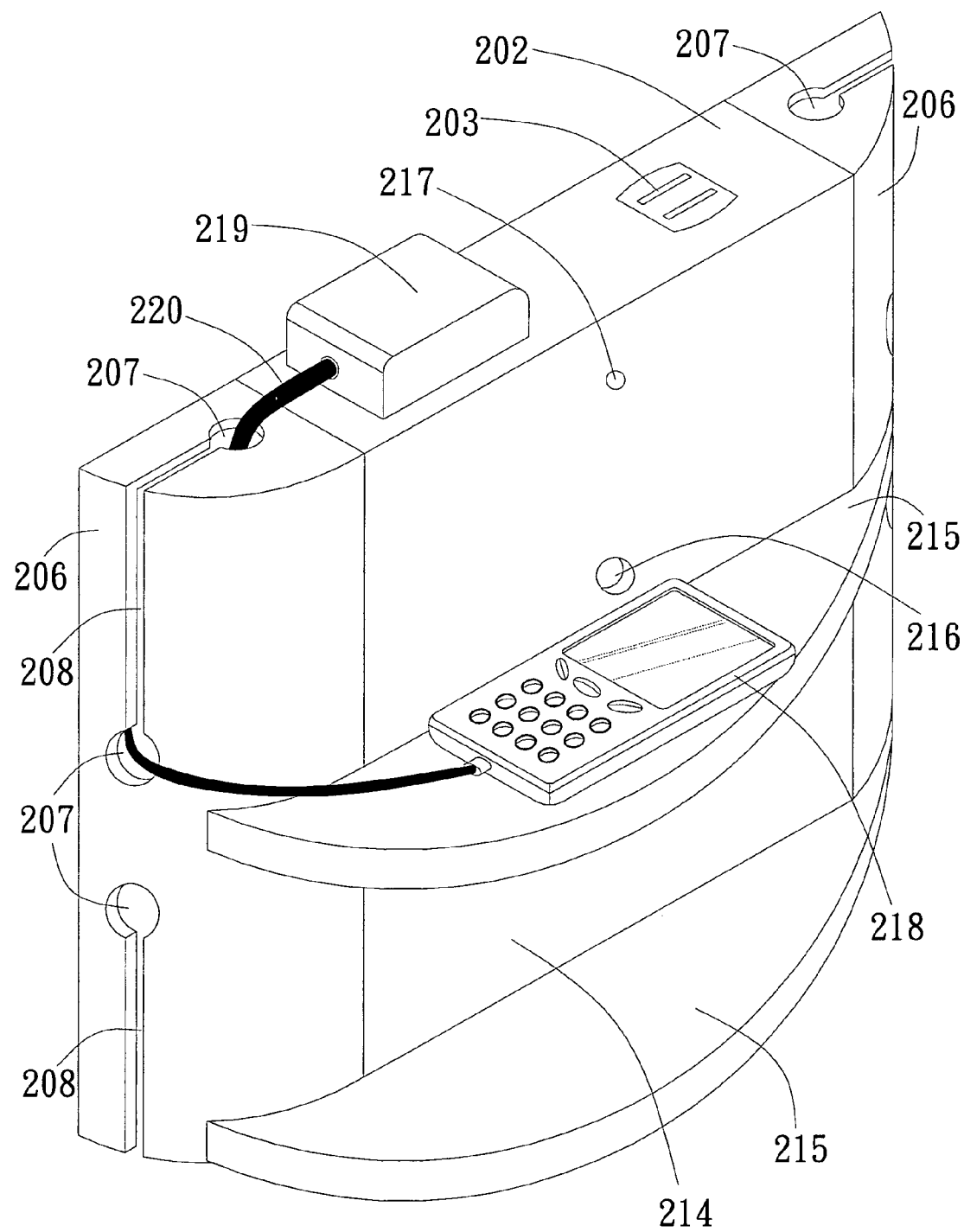

The box-shaped body 201 (shown in FIGS. 7 & 8) of the power supply cover box 200 includes a second end 205 wherein the cord management container 206 is disposed thereon. In one embodiment, the first end 202 is on the front of the box-shaped body 201, and the second end 205 is on the top/bottom of the box-shaped body 201, as illustrated in FIGS. 5a & 5b. In another embodiment, the first end 202 is on the top/bottom of the box-shaped body 201, and the second end 205 is on the side of the box-shaped body 201, as illustrated in FIGS. 6a & 6b. For all of these embodiments, the cord management containers 206 are disposed corresponding to the outlet openings. FIG. 5a is a schematic diagram of a power supply cover box in accordance with the present invention. FIG. 5b illustrates an embodiment of the power supply cover box in FIG. 5a. Similarly, FIG. 6a shows a schematic diagram of an alternative power supply cover box in accordance with the present invention, and FIG. 6b illustrates an embodiment of the power supply cover box in FIG. 6a.

Both of FIGS. 5a & 6a show two cord management containers 206 disposed on the box-shaped body 201 corresponding to the four electrical outlets 203 on the first end 202. In another embodiment, however, the power supply cover box 200 may only have a single cord management container 206 or have more than two cord management containers 206. As FIGS. 5a-6b show, the cord container 206 can hold two cords and the excessive cords can be stuffed through slits 208 on the surface of the cord containers 206. In FIG. 5a, two cord holes 207 are formed on the front surface of the cord container 206 and one cord hole is formed on each of two side surfaces of the cord containers 206. On each of the right half and left half of the cord management container 206, a slit 208 is connecting a pair of cord holes 207 formed on the front surface and side surface respectively of the cord container 206. Again, the slits 208 on the surface of the cord containers 206 form passages connecting the corresponding cord holes 207. The slits 208 have a predetermined width, which is preferably slightly smaller than the diameter of a regular electric cord, to retain the cord within the cord management container 206. In other words, under normal circumstances, the cord management containers 206 only allow the cord to enter or exit through the cord holes 207.

Figure 7:
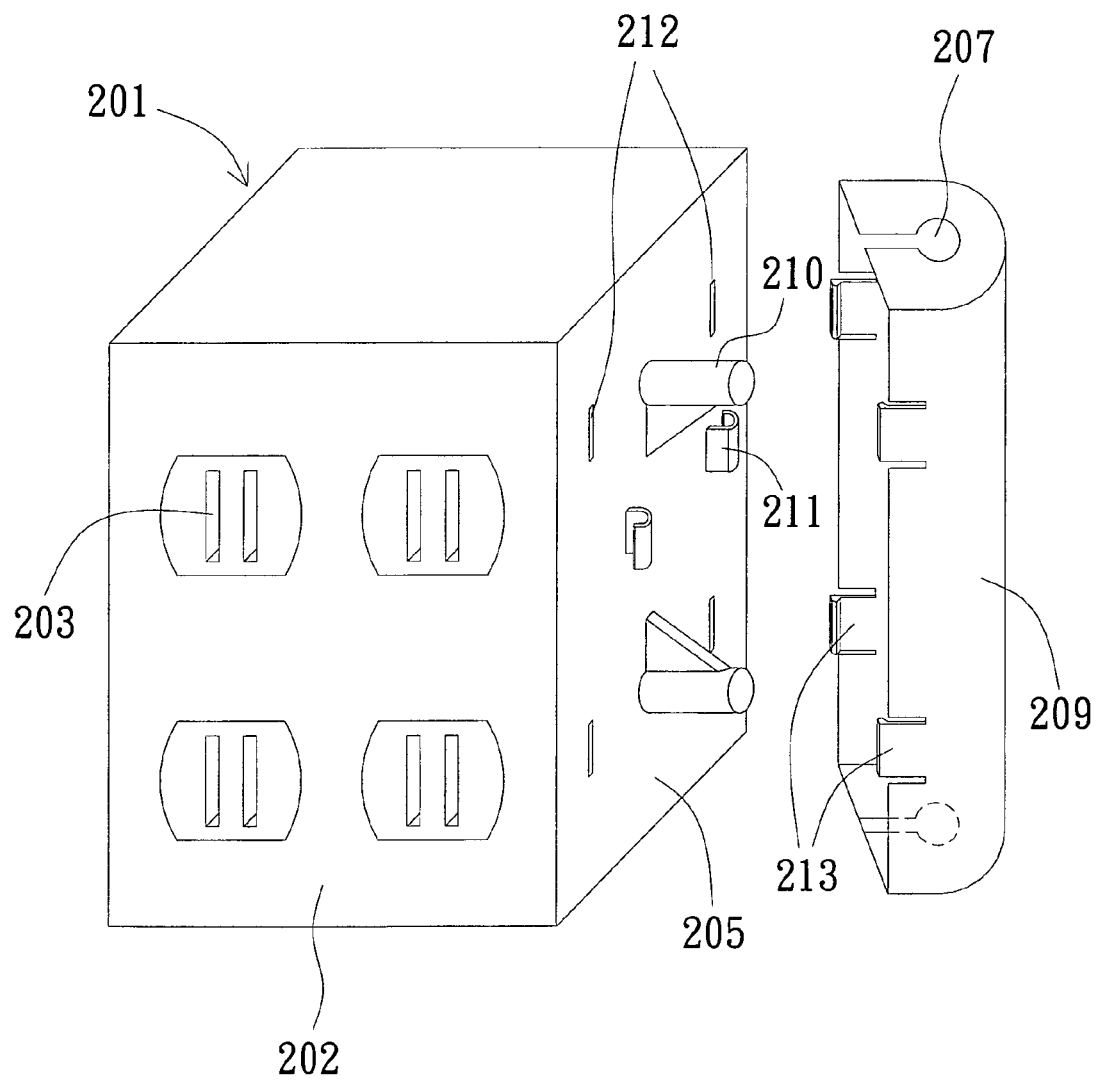
FIG. 7 is a schematic diagram of the box-shaped body of the power supply cover box showing a first end and second end in accordance with the present invention.

Similar to the cord management container 104 of the outlet cover 100, the cord management container 206 of the power supply cover box 200 may further include a cord cover 209. The cord cover 209 is removable from the second end 205 of the power supply cover box 200, as shown in FIG. 7, and can be bound with the second end 205 using adhesive, heat staking, adhesive double sided tape, mechanical slides, mechanical hooks, slots or the combination thereof. In one embodiment, the cord cover 209 is fastened onto the second end 205 through four insetting pieces 213 on the edge of the cord cover 209 inserting into four slots 212 on the second end 205 of the box-shaped body 201, as illustrated in FIG. 7. The cord cover 209 has a pair of cord holes 207 oppositely disposed on the top surface and the bottom surface respectively. The cord cover 209 also forms a space to contain the cord and to serve the function as a passage which connects the pair of cord holes 207. Furthermore, two winding posts 210 for winding excessive cords into coiled cords and two hooks 211 disposed at side of the two winding posts for holding a rubber band or the like to keep the coiled cord in place are disposed on the second end 205 of the box-shaped body 201, just as the winding posts 108 and the hooks 109 disposed on the outlet surface 101 of the outlet cover 100.

Figure 8:
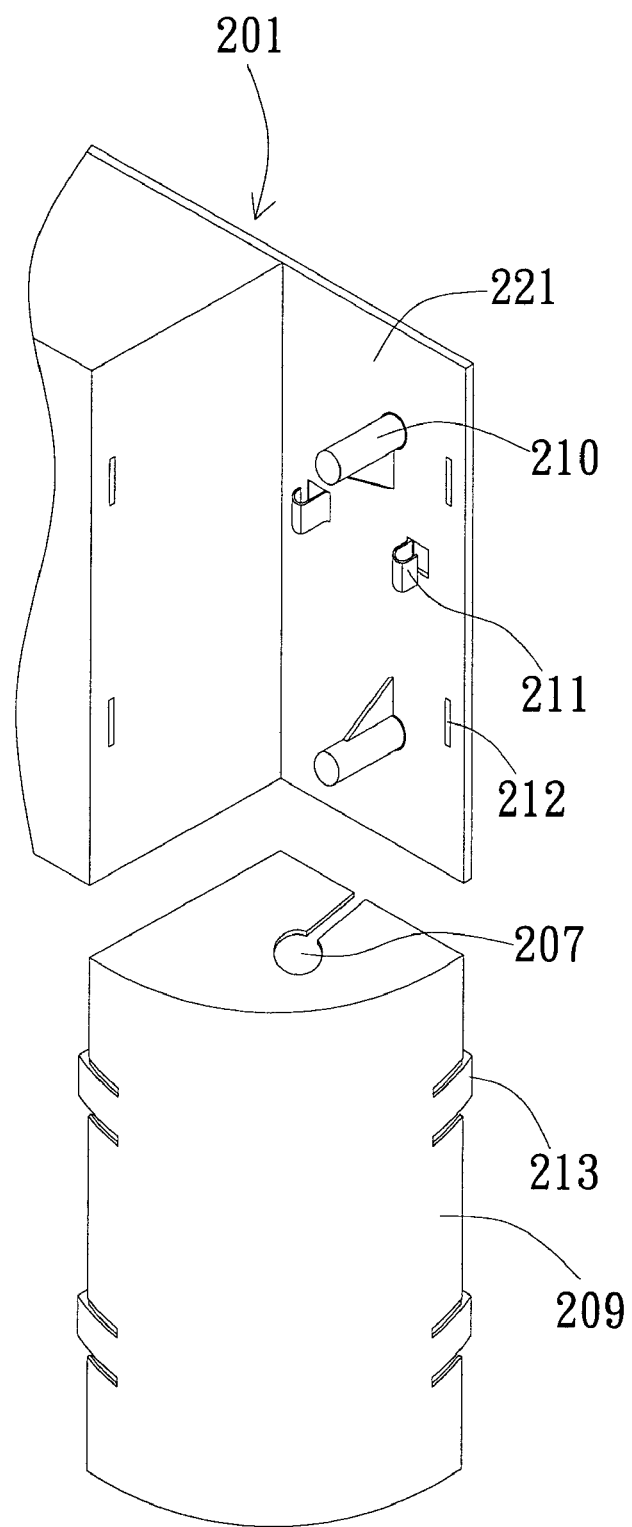
FIG. 8 shows a schematic diagram of an alternative cord cover of the power supply cover box according to an embodiment of the present invention.

In yet another embodiment of the present invention, the box-shaped body 201 of the power supply cover box 200 has a back end extending horizontally to have two extending portions 221 on the right and left respectively. FIG. 8 shows a schematic diagram of an alternative cord cover of the power supply cover box according to an embodiment of the present invention. Instead of being disposed on the second end 205 as previous embodiments, the winding posts 210 and the hooks 211 are disposed on the extending portions 221 of the back end of the box-shaped body 201. In this case, the cross-section of the cord cover 209 is in quarter-circle shape. As the quarter-circle cord cover 209 is removable from the box-shaped body 201 of the power supply cover box 200, the attachment methods with the box-shaped body 201 include adhesive, heat staking, adhesive double sided tape, mechanical slides, mechanical hooks, slots or the combination thereof. In FIG. 8, the cord cover 209 is fastened onto the box-shaped body 201 through four insetting pieces 213 on the edge of the cord cover 209 inserting into four slots 212 on the box-shaped body 201 of the power supply cover box 200.

Similar to the materials of the outlet cover 100, the materials of the power supply cover box 200 are also flame retardant and UL certified. The materials of the cord management containers 206 are preferably rubber, silicone rubber, hard plastic or the combination thereof.

The power supply cover box 200 further comprises utility trays 215 disposed on a third end 214 of the box-shaped body 201. The utility trays 215 are preferably configured with an angle to hold the connected devices securely. In FIG. 5a, four utility trays 215 are shown and disposed on both side ends of the box-shaped body 201, whereas two utility trays 215 are configured on the front of the box-shaped body 201 in FIG. 6a. As mentioned previously, it shall be noted that the plurality of cord holes 207 are formed on the surface of the cord containers 206 corresponding to the positions of both the electrical outlets 203 and the utility trays 215, as depicted in FIGS. 5a & 6a, thereby enhancing the efficiency of cord management purpose of the present invention.

Similar to the screw hole 113 of the outlet cover 100, a screw hole 216 is used to set the power supply cover box 200 securely. Furthermore, a LED surge indicator 217 is disposed on the box-shaped body 201 to ensure steady power delivery and prevent electric surge from damaging the connected electronics or appliances.

Figure 9A:
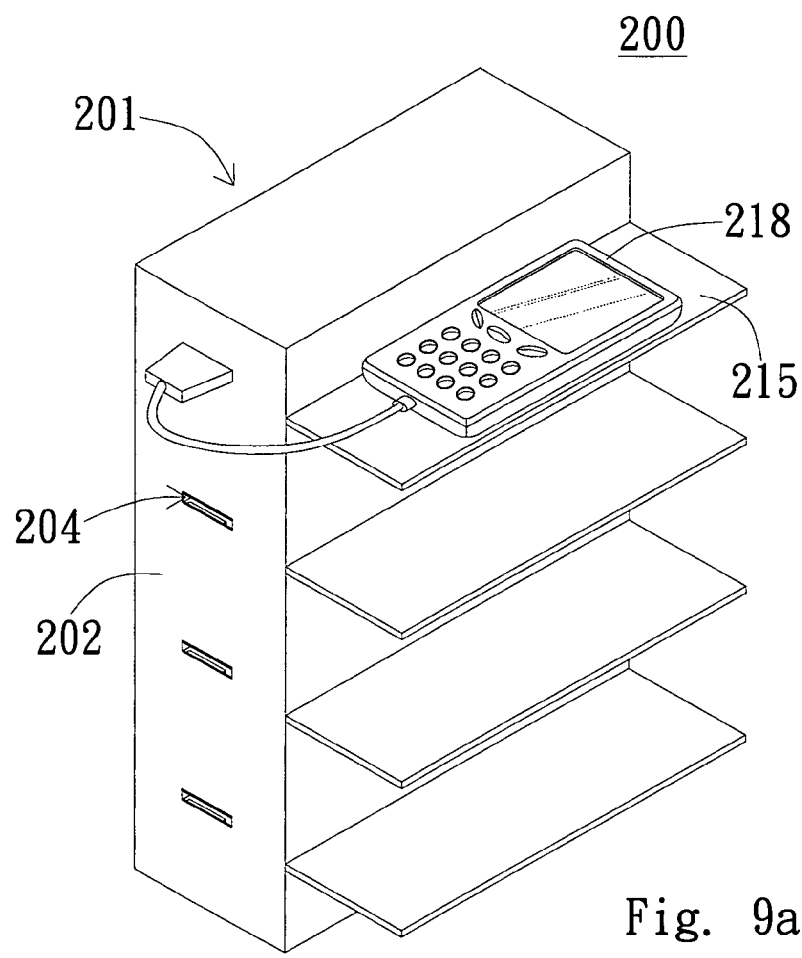
FIG. 9a illustrates an embodiment of the power supply cover box with USB ports in accordance with the present invention.
Figure 9B:
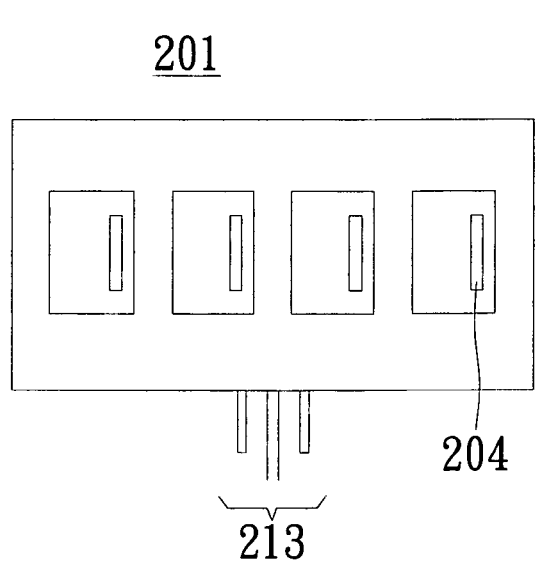
FIG. 9b is a bottom view of the power supply cover box in accordance with the present invention.

Still applying the same principle, the present invention proposes a power supply cover box 200 comprising a box-shaped body 201 and at least one utility tray 215. As FIG. 9a shows, four USB ports 204 disposed within the four outlet openings are configured on the first end 202 of the box-shaped body 201 of the power supply cover box 200. In this embodiment, the USB ports 204 are configured on the side of the box-shaped body 201. In another embodiment, USB ports 204 are configured onto the bottom of the box-shaped body 201 of the power supply cover box 200 to prevent dust from falling into the ports, as depicted in FIG. 9b. Moreover, a three prong plug 213 attached to the back of the box-shaped body 201 of the power supply cover box 200 is used for tapping into electric power.

In conclusion, the outlet cover/power supply cover box proposed by the present invention is substantially the same as they are designed employing the same principle. The advantages they offer include convenient cord storage through the cord management container or the cord cover. Not only are they aesthetically attractive by hiding unsightly bundles of excessive cords, but also they prevent people from tripping over the cord and minimize the potential hazards. Second, as the charged devices are lifted up from the floor, kitchen counter or table top, and put on the utility trays of outlet cover/power supply cover box of the present invention, a centralized charging station for the connected devices is created and the clutter of excessive cords is further reduced.

Moreover, as there are increasing hand held devices that can be charged by USB, such as PDA, MP3, digital cameras, and many cell phones, the power supply cover box with USB ports of the present invention eliminate the excessive cords and the requirement of adapters.

From the foregoing, it shall be appreciated that specific embodiments of the invention have been described herein for purposes of illustration, but that various modifications and alterations may be made by those skilled in the art without deviating from the spirit and scope of the invention. For example, it shall be understood that there is no intention to limit the configuration of the power supply cover box 200 as well as the number of the cord management containers 206 and the utility trays 215 disclosed above, but on the contrary, the invention is to cover all modifications, alternate constructions and equivalents falling within the spirit and scope of the invention. Accordingly, the invention is not limited except as by the appended claims.

What is claimed is:

1. An outlet cover comprising:
   an outlet surface having at least one outlet opening;
   a cord management container disposed corresponding to said outlet opening, wherein said cord management container has a plurality of cord holes and at least one passage connecting said plurality of cord holes; and
   at least one utility tray disposed corresponding to said cord management container.

2. The outlet cover of claim 1, wherein said cord management container includes a cord cover and is removable from said outlet surface.

3. The outlet cover of claim 2, wherein said cord cover has at least one winding post disposed on said outlet surface.

4. The outlet cover of claim 2, wherein said cord cover has at least one hook disposed at side of said winding post on said outlet surface.

5. The outlet cover of claim 1, wherein said cord management container has a top surface, a side surface and a bottom surface, said top surface and said bottom surface being opposite to each other, said side surface being connecting said top surface and said bottom surface.

6. The outlet cover of claim 1, wherein one of said plurality of cord holes is formed on a top surface of said cord management container.

7. The outlet cover of claim 1, wherein one of said plurality of cord holes is formed on said bottom surface of said cord management container.

8. The outlet cover of claim 1, wherein said outlet opening is on one half of said outlet surface, and said cord management container is on the other half of said outlet surface.

9. The outlet cover of claim 1, wherein the material of said cord management container is flame retardant.

10. The outlet cover of claim 1, wherein the material of said cord management container is selected from the group of rubber, silicone rubber, hard plastic and the combination thereof.

11. The outlet cover of claim 1, wherein said outlet surface and said cord management container are integratedly formed.

12. The outlet cover of claim 1, wherein said outlet surface and said cord management container are bound together by employing the method selected from the group of adhesive, heat staking, adhesive doubled sided tape, mechanical slides, mechanical hooks, slots and the combination thereof.

13. The outlet cover of claim 1, wherein said outlet surface said utility tray are integratedly formed.

14. The outlet cover of claim 1, wherein said utility tray is disposed with said outlet surface through a groove formed thereon and is removable from said outlet surface.

15. A power supply cover box comprising:
   a box-shaped body including a first end having at least one outlet opening; and
   a cord management container disposed corresponding to said outlet opening, wherein said cord management container has a plurality of cord holes and passages connecting said plurality of cord holes;
   at least one utility tray disposed on said box-shaped body corresponding to said plurality of cord holes.

16. The power supply cover box of claim 15 further comprising an electrical outlet disposed within said outlet opening.

17. The power supply cover box of claim 15 further comprising a universal serial bus port disposed within said outlet opening.

18. The power supply cover box of claim 15, wherein said box-shaped body has a top end and a bottom end, said cord management container has two side surfaces and one front surface, said two side surfaces being opposite to each other, said front surface being connecting said two side surfaces, and said cord management container is disposed on one of said top end and said bottom end of said box-shaped body.

19. The power supply cover box of claim 18, wherein at least one of said plurality of cord holes is formed on one of said two side surfaces of said cord management container.

20. The power supply cover box of claim 18, wherein at least one of said plurality of cord holes is formed on said front surface of said cord management container.

21. The power supply cover box of claim 18, wherein said passages connect one of said cord holes formed on said front surface with another said cord hole formed on one of said two side surfaces.

22. The power supply cover box of claim 15, wherein said box-shaped body has a side end, said cord management container has a top surface, a side surface and a bottom surface, and said cord management container is disposed on said side end of said box-shaped body.

23. The power supply cover box of claim 22, wherein at least one of said plurality of cord holes is formed on said top surface of said cord management container.

24. The power supply cover box of claim 22, wherein at least one of said plurality of cord holes is formed on said side surface of said cord management container.

25. The power supply cover box of claim 22, wherein at least one of said plurality of cord holes is formed on said bottom surface of said cord management container.

26. The power supply cover box of claim 22, wherein said passages connect one of said cord holes formed on said side surface with another said cord hole formed on said top surface or said bottom surface of said cord management container.

27. The power supply cover box of claim 15, wherein said box-shaped body includes a second end, said cord management container being disposed on said second end of said box-shaped body.

28. The power supply cover box of claim 27, wherein said second end is adjacent to said first end.

29. The power supply cover box of claim 28, wherein said first end is on the front of said box-shaped body, and said second end is on the top of said box-shaped body.

30. The power supply cover box of claim 28, wherein said first end is on the top of said box-shaped body, and said second end is on the side of said box-shaped body.

31. The power supply cover box of claim 27, wherein said cord management container includes a cord cover having a top surface, a side surface and a bottom surface, said top surface and said bottom surface being opposed to each other, said side surface being connecting said top surface and said bottom surface.

32. The power supply cover box of claim 31, wherein said cord cover has at least one winding post disposed on said second end of said box-shaped body.

33. The power supply cover box of claim 32, wherein said cord cover has at least one hook disposed at side of said winding post on said second end.

34. The power supply cover box of claim 31, wherein said box-shaped body has a back end extending horizontally to have at least one extending portion.

35. The power supply cover box of claim 34, wherein said cord cover has at least one winding post disposed on said extending portion.

36. The power supply cover box of claim 35, wherein said cord cover has at least one hook disposed at side of said winding post on said extending portion.

37. The power supply cover box of claim 15, wherein the material of said power supply cover box is flame retardant.

38. The power supply cover box of claim 15, wherein the material of said cord management container is selected from the group of rubber, silicone rubber, hard plastic and the combination thereof.

39. The power supply cover box of claim 15, wherein said box-shaped body includes a third end, said utility tray being disposed on said third end of said box-shaped body.

40. The power supply cover box of claim 15 further comprising a light emitting diode surge indicator on said box-shaped body.

* * * * *